(12) United States Patent
Stevens et al.

(10) Patent No.: US 7,645,972 B2
(45) Date of Patent: Jan. 12, 2010

(54) HIGH-SPEED READOUT OF A WAVEFRONT SENSOR USING POSITION SENSING DEVICE

(75) Inventors: Mark A. Stevens, Oviedo, FL (US); Allen C. Layton, Windermere, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/637,787

(22) Filed: Dec. 13, 2006

(65) Prior Publication Data

US 2008/0144018 A1 Jun. 19, 2008

(51) Int. Cl.
*G01J 1/20* (2006.01)
(52) U.S. Cl. .................................. 250/201.9; 356/521
(58) Field of Classification Search ............. 250/201.9, 250/216, 237 G, 237 R; 356/121, 451, 452, 356/521; 359/244, 245, 249
See application file for complete search history.

(56) References Cited

U.S. PATENT DOCUMENTS

2003/0222196 A1* 12/2003 Hutchin et al. ........... 250/201.9

2008/0042042 A1* 2/2008 King et al. ............... 250/201.9

* cited by examiner

*Primary Examiner*—Seung C Sohn
(74) *Attorney, Agent, or Firm*—Birch, Stewart, Kolasch & Birch, LLP

(57) ABSTRACT

An apparatus rapidly reads out wavefront errors of an input wavefront and includes a holographic optical element (HOE), a position readout detector and a readout device. The HOE receives the input wavefront and includes a hologram of a particular wavefront recorded with reference waves, each defining a particular aberration coefficient. The position readout detector includes a plurality of position sensing devices (PSDs) receiving an optical output of the HOE, each PSD sensing the occurrence and magnitude in the input wavefront of any of the particular aberrations defined by the reference waves recorded to the holographic optical element with the particular wavefront. The readout device provides a readout value of each PSD upon application of the input wavefront to the holograph optical element, each readout value representing in the input wavefront the presence and magnitude of any of the particular aberrations defined by the reference waves.

28 Claims, 4 Drawing Sheets

HIGH-SPEED READOUT OF A WAVEFRONT SENSOR USING POSITION SENSING DEVICE

FIELD OF THE INVENTION

The invention relates generally to a device for high-speed readout of a wavefront sensor using a position sensing device.

BACKGROUND OF THE INVENTION

The propagation of energy through a medium is often described as the propagation of a wave through the medium. If the medium is not a vacuum, the medium will cause some degree of distortion to the wave. For example, if the medium is the atmosphere, small local variations in air density cause time varying effects that are broadly classified as scintillation. Scintillation reduces the acuity of imagery and reduces the ability to focus laser beams that have propagated through the atmosphere. These effects are well documented in the art and tend to be most severe near the earth's surface where air density and air heating, due to the proximity with the earth's surface, are both greatest. For example, if you look far down a road on a very hot and sunny day, you will often see what is usually called a mirage. What you are seeing is the rapidly changing temperature in the air causing it to act like a thick, constantly bending lens. These effects have always degraded astronomical observations. Consequently, observatories tend to be built on high ground where the air is less dense and also look up (to space) at steep angles to reduce the path through the atmosphere.

In recent years, technology has advanced to allow active control systems that monitor the atmospheric distortion and then compensate for the measured distortion. These active systems are referred to as adaptive optics (AO). The basic idea of an adaptive optics system is to rapidly sense the wavefront errors and then to correct for them on timescales faster than those at which the atmosphere changes. Consequently, there are really three parts to an adaptive optics system: 1) a component which senses wavefront errors/distortions; 2) a control system which figures out how to correct these errors/distortions; and 3) an optical element which receives the signals from the control system and implements wavefront corrections (e.g., a deformable mirror controlled by the control system). The device that senses the distortions in the incoming wavefront of light is called a wavefront sensor.

The most commonly used approach for a wavefront sensor is the Shack-Hartmann method. As shown in FIG. 1, this approach is completely geometric in nature and so has no dependence on the coherence of the sensed optical beam. The incoming wavefront is broken into an array of spatial samples, called subapertures of the primary aperture, by a two dimensional array of lenslets. The subaperture sampled by each lenslet is brought to a focus at a known distance F behind each array. The lateral position of the focal spot depends on the local tilt of the incoming wavefront; a measurement of all the subaperture spot positions is therefore a measure of the gradient of the incoming wavefront. A two-dimensional integration process called reconstruction can then be used to estimate the shape of the original wavefront, and from there the distortion is determined so that the correction signals for the deformable mirror can be derived. Thus, large amount of computation is necessary just to provide the estimated shape of the original wavefront in order to determine the distortion.

An AO system with such type of wavefront sensor is practical under benign conditions that produce wavefront distortions that change at relatively slow rates. However, high speed changes of wavefront distortions that occur in atmospheric paths near the earth's surface are more difficult to correct because they require intensive computations to determine each correction. Implementing such intensive computations is not always practical when imaging targets and propagating laser beams through atmospheric paths near the earth's surface.

The inventors have recently implemented a new technique that uses a holographic optical element (HOE) to dramatically reduce the calculations needed to determine wavefront distortions. The HOE divides the distortion into a number of orthogonal components. The HOE is designed to focus the energy corresponding to a particular component along a predetermined line. The location of the focused spot along the line is designed to indicate the intensity of the component. The measurement of the locations of the spots, corresponding to the intensity of the various orthogonal components, provides a measurement of the wavefront distortion without the need for intensive computer computation. Since intensive computations are not required, this technique appears to be practical for determining wavefront distortions that occur in atmospheric paths near the earth's surface.

With this in mind, the inventors initially implemented this technique using a 2-dimensional charged couple device (CCD) to read out the position of each spot. However, it was soon discovered that the needed update rate far exceeded the maximum readout rate of the CCD. Subsequently, the inventors implemented this technique using a set of 1-dimensional CCDs. Each linear CCD was used to read out the orthogonal components of the distortion. The linear CCDs were operated in parallel to greatly increase the update rate. However, even this increase in update rate was not sufficient to measure the high frequency components of the wavefront distortion. In addition, it was found that the actual distortion magnitude often fell between the calibration points. For example, if the calibration points of the particular orthogonal component of the distortion included a ½ wave and a ¾ wave and that actual distortion was 0.6 wave, two spots were generated, one at ½ wave and a less intense spot at ¾ wave. The CCD would read out both spots, but then a computation based on the relative intensity at the two locations was required to determine the actual magnitude of the distortion. Such required computation slowed the process so that this implementation also was not practical for use in imaging targets and propagating laser beams through atmospheric paths near the earth's surface.

Thus, none of the inventors' prior attempts to implement using a holographic optical element (HOE) to dramatically reduce the calculations needed to determine wavefront distortions has proven satisfactory.

However, because an HOE dramatically reduces the calculations needed to determine wavefront distortions, making it practical for use where rapid determination of wavefront distortions is necessary (e.g., wavefront distortions that occur in atmospheric paths near the earth's surface), there is a need to provide a way of reading out the distortion information of an HOE that is faster than using CCDs.

DISCLOSURE OF THE INVENTION

This and other needs are met by the present invention. According to one aspect, an apparatus rapidly reads out wavefront errors of an input wavefront and comprises a holographic optical element (HOE), a position readout detector and a readout device. The HOE is configured to receive the input wavefront and includes a hologram of a particular wavefront recorded with a plurality of reference waves, each reference wave defining a particular aberration. The position readout detector includes a plurality of position sensing devices configured to received an optical output of the HOE, each position sensing device sensing the occurrence and magnitude in the input wavefront of any of the particular aberrations defined by the plurality of reference waves recorded to the holographic optical element with the particular wavefront. The position readout device is configured to provide a readout value of each position sensing device upon application of the input wavefront to the holograph optical element, the readout value of each position sensing device representing in the input wavefront the presence and magnitude of any of the particular aberrations defined by the plurality of reference waves.

In another aspect of the invention, each positioning sensing device is connected to ground via a bias voltage and includes a pair of output contacts. The pair of output contacts provide a current inversely proportional to a degree of lateral displacement of a respective component of the input wavefront that corresponds to one of the particular aberrations defined by the plurality of reference waves.

In still another aspect of the invention, each positioning sensing device comprises a reversed biased, lateral effects photoconductive junction with a wide collection area and an anode layer. The output contacts of the pair of output contacts are positioned at opposing ends of the anode layer which is doped to behave as a resistive element to photo-generated carriers, created by the input wavefront, moving towards the respective output contacts.

In yet another aspect of the invention, the apparatus further includes a plurality of analog computational devices. Each analog computation device is connected to the pair of output contacts of a corresponding positioning sensing device and performs a combinatorial math function of $(A-B)/(A+B)$ to provide a single voltage value, where A and B are voltages corresponding to respective output contacts of the pair of output contacts of the corresponding positioning sensing device.

In still yet another aspect of the invention, each analog computational device comprises a series of analog operational amplifiers.

Additional advantages and aspects of the present invention will become readily apparent to those skilled in the art from the following detailed description, wherein only an exemplary embodiment of the present invention is shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout, and wherein.

DESCRIPTION OF THE INVENTION

Figure 1:
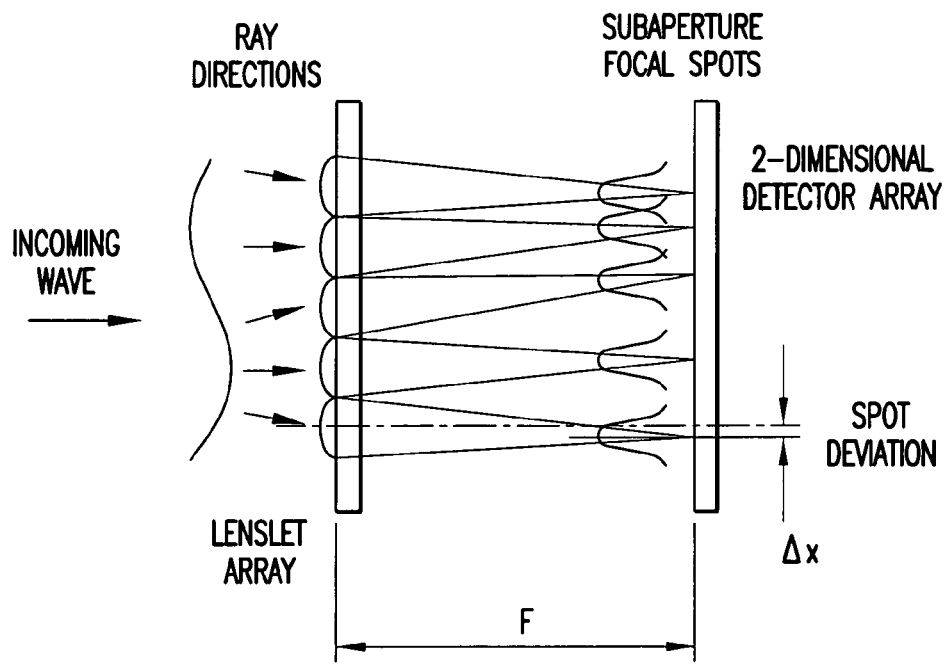
FIG. 1 is a diagram illustrating a prior art wavefront sensor.
Figure 2:
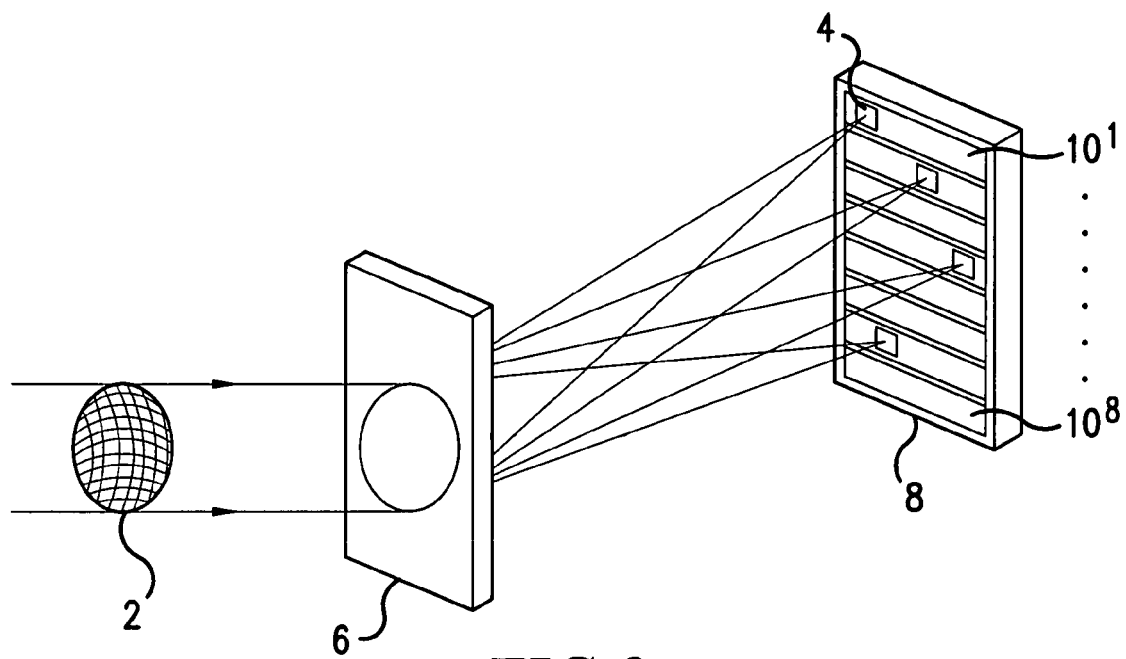
FIG. 2 is a diagram illustrating an arrangement where an input wavefront is input to a programmed HOE having and resulting effect on a position readout detector.

FIG. 2 illustrates an example of a wavefront 2 being input to HOE 6, which reconstructs multiple focus beams on a detector 8. The detector 8 is illustrated as having eight (8) position sensing devices (PSDs) 10 ($10^1$-$10^8$). While eight PSDs are illustrated, other numbers of PSDs can be used. In FIG. 2, the HOE 6 provides high speed detection and readout of the orthogonal components of the distortion when the wavefront 2 is input. The HOE 6 has initially been programmed by recording, which is explained with reference to FIG. 3.

Figure 3:
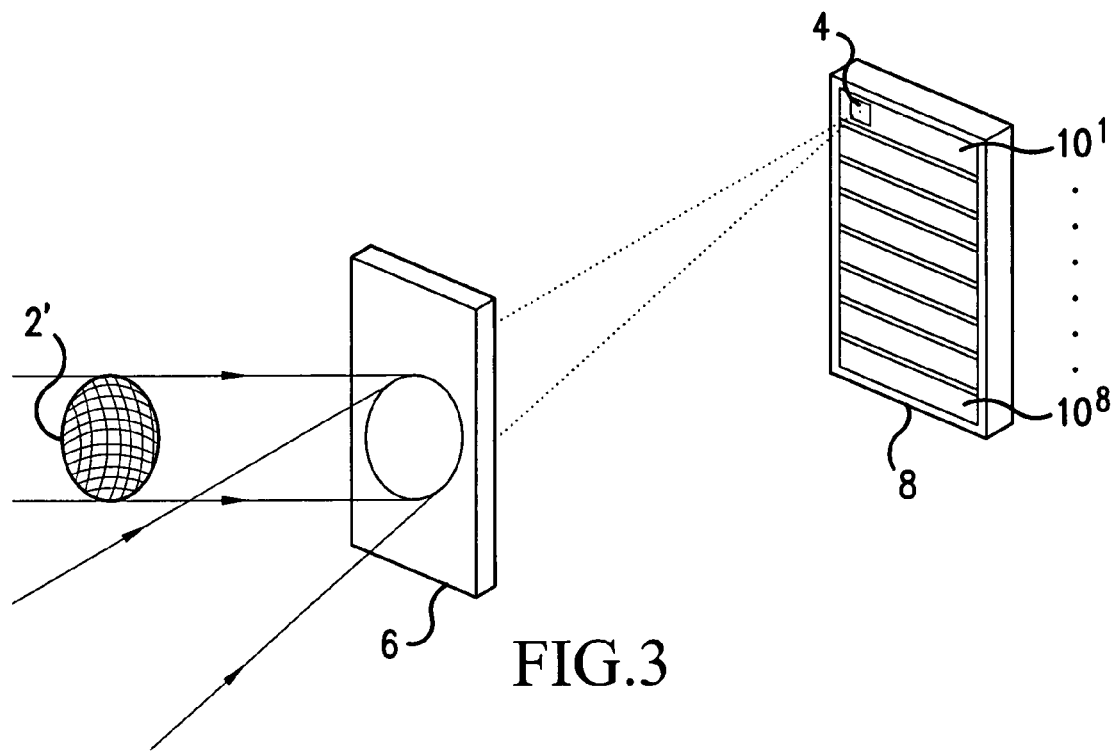
FIG. 3 is a diagram illustrating a wavefront with a particular aberration recorded with a reference wave and the effect on the position readout detector.

As illustrated in FIG. 3, a wavefront 2' having a particular aberration and magnitude ($Z_0$, $A_0$) is recorded to the HOE 6 with a reference wave focused to a particular point 4 on the detector 8. Thus, the reference wave defines a particular aberration coefficient. While FIG. 3 illustrates recording wavefront 2' having a particular aberration and magnitude ($Z_0$, $A_0$) to the HOE 6 using only one reference wave corresponding to the one aberration, the HOE 6 is generally recorded with a plurality of different aberrations that can be present in the wavefront, using a plurality of different reference waves corresponding to the plurality of different aberrations and each reference wave is focused to a different predetermined point on the detector 8.

Figure 4:
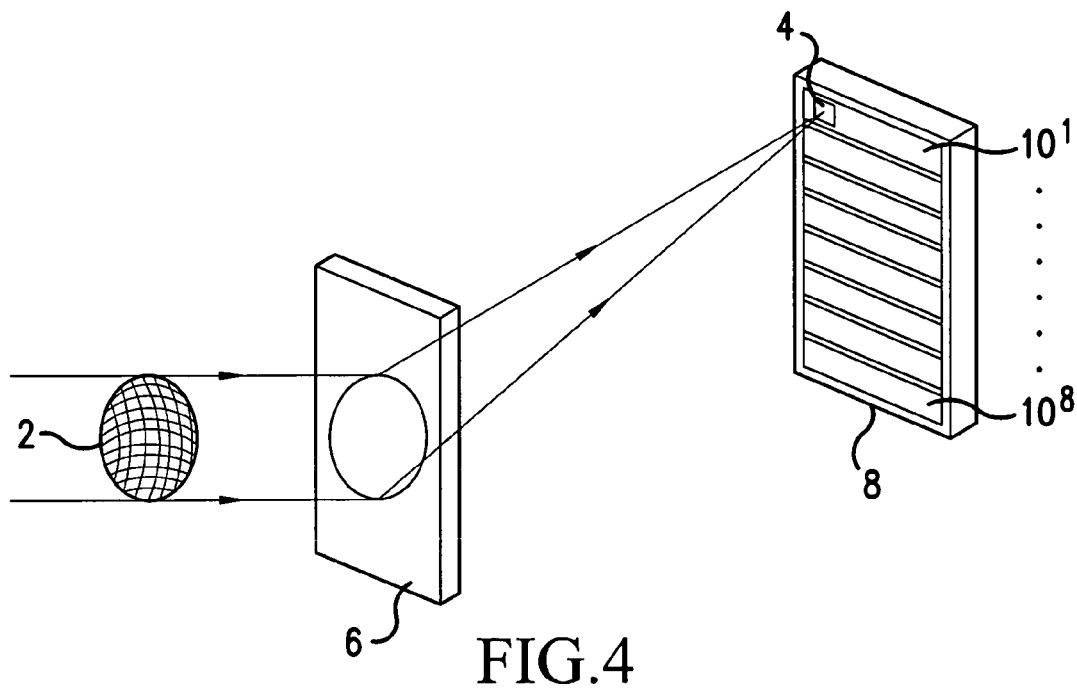
FIG. 4 is a diagram illustrating reconstruction of a reference beam when a recorded wavefront aberration is present on the wavefront input to the HOE.

After the HOE has been recorded, if the same wavefront aberration ($Z_0$, $A_0$) is present on the wavefront 2 input to the HOE 6, the reconstructed reference beam corresponding to the wavefront aberration will focus at the predetermined point 4, as illustrated in FIG. 4. However, when the HOE 6 is recorded with a plurality of wavefronts, each having a different aberration ($Z_x$, $A_y$), using a plurality of different reference waves corresponding to the plurality of different aberrations, as is generally the case, if the wavefront 2 input to the HOE 6 has any of the same aberrations that are recorded to the HOE 6, a plurality of reference waves corresponding to each different aberration that is present in the wavefront will be reconstructed. Each reconstructed reference beam will focus to a different predetermined point corresponding to the aberration (see FIG. 2).

Referring again to FIG. 2, in the example illustrated, the HOE 6 has been recorded with a plurality of different aberrations using a plurality of reference waves. Thus, when multiple of the recorded (to the HOE 6) aberrations are present on the wave front 2 (object beam) that is input to the HOE 6, multiple focus beams will be reconstructed and focused to different predetermined points on the detector 8. Each reconstructed focus beam represents the presence and strength of the particular aberration coefficient that is defined by a respective reference wave. It is understood that Zernike polynomials can be used to express wavefront shape in polynomial form since they are made up of terms that are of the same form as the types of aberrations often observed in optical tests.

Figure 5:
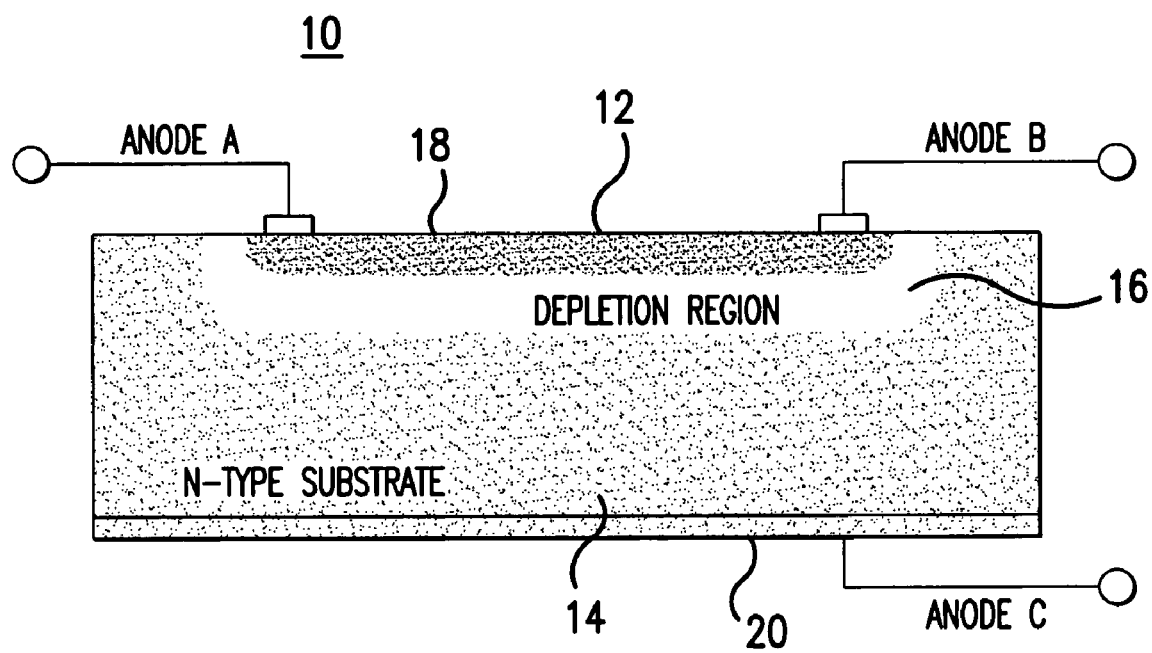
FIG. 5 is an illustration of a section of a position sensing device of the position readout detector.

FIG. 5 is a sectional illustration of a position sensing device (PSD) 10 of FIG. 4 taken along sectional line 5-5 (lengthwise long a row direction). The PSD 10 is a flat photodiode having an N-type substrate 14, depletion layer 16 and a P-type anode layer 12 acting as resistive layer. The orientation of the sectional illustration of FIG. 5 is such that photons impinging onto any PSDs $10^1$-$10^8$ of FIG. 4, impinge onto an upper main surface 18 of the P-type anode layer 12. As illustrated in FIG.

5, anode A (one output contact) and anode B (another output contact) are positioned on the upper main surface 18 of the P-type anode layer 12 at opposing ends of the P-type anode layer 12. A cathode C is connected to a lower surface 20 of the N-type substrate 14. The PSD 10 is a reversed biased, lateral effects photoconductive junction with a wide collection area. The P-type anode layer 12 has a P+ doping so has to behave as a resistive element to photo-generated carriers moving towards an output contact. With anode A and anode B placed on the upper main surface 18 at opposing ends of P-type anode layer 12 (acting as a resistance layer), what results in effect is a potentiometer where the wiper is replaced by incident photon energy producing an input voltage. In this arrangement, the pair of contacts (anode A and anode B) will both provide currents that are inversely proportional to the distance from the centroid of the received energy.

Figure 6:
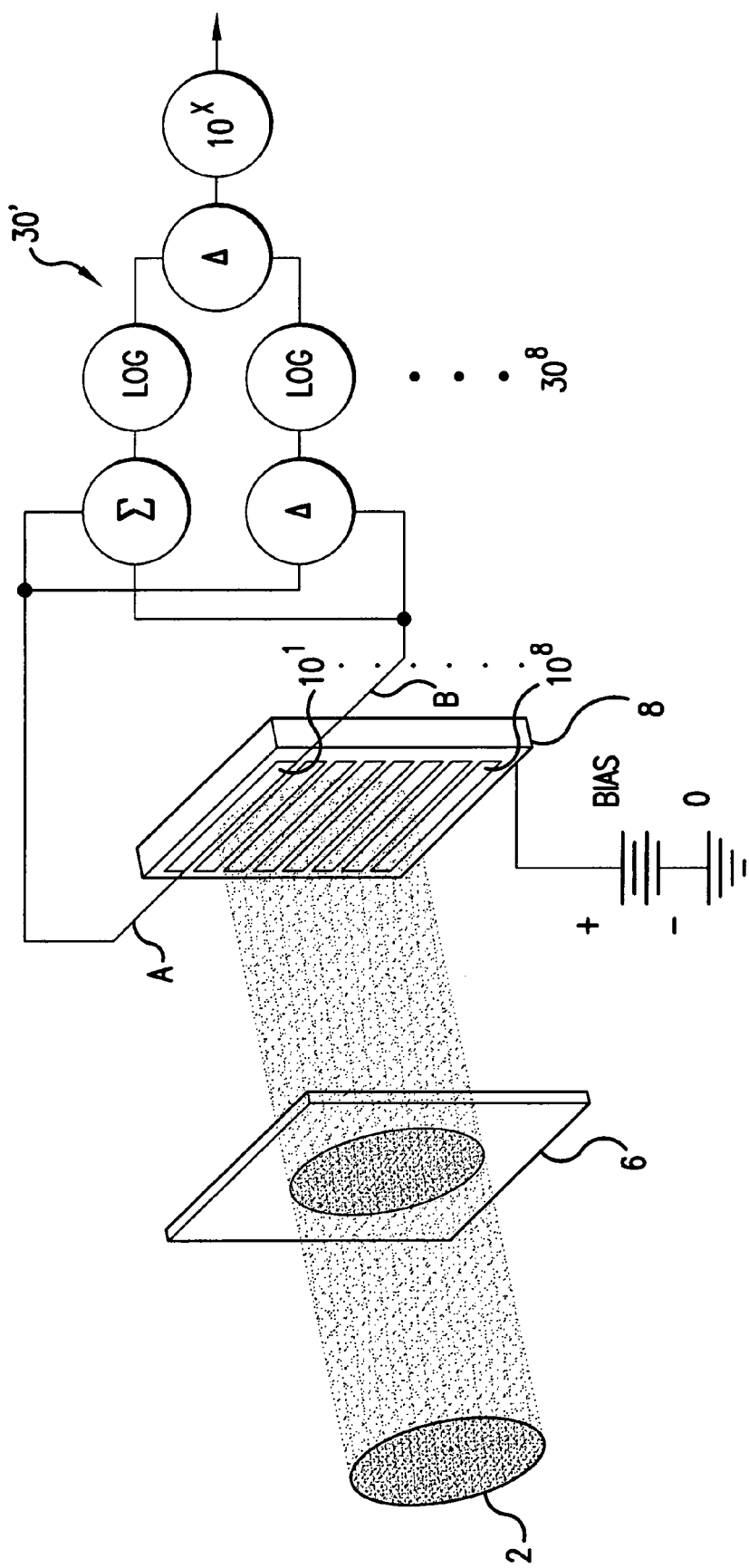
FIG. 6 is a diagram illustrating an arrangement for reading out the detector when the input wavefront is input.

FIG. 6 illustrates an arrangement for reading out orthogonal components of the distortion of the HOE 6 using the detector 8 having eight PSDs $10^1$-$10^8$. Each contact pair, identified as A and B (corresponding to anode A and anode B), is connected to analog circuit 30. The cathodes C of the eight PSDs $10^1$-$10^8$ are all connected to ground via a Bias voltage. The analog circuitry 30 comprises a series of high bandwidth analog operational amplifiers that perform the combinatorial math function to yield a single voltage value of $(A-B)/(A+B)$. This single voltage represents the degree of lateral displacement from the center of the focused spot. There will be one signal for each orthogonal component of the distortion when the wavefront 2 (object wave) is input. Since eight PSDs 10 are illustrated as comprising detector 8, eight sets of analog circuit 30 ($30^1$-$30^8$) are necessary (one set for each PSD 10).

The outputs of the analog circuitry 30 are made available for use by any device/apparatus that uses the readout of a wavefront sensor. For example, the output of the analog circuitry 30 can be used with the earlier described adaptive optics (AO) that monitor atmospheric distortion and then compensate for the measured distortion. With the present invention, it is possible to provide readouts (representing wavefront errors) in excess of 100 kHz. This speed of providing readouts (representing wavefront errors) should allow the AO system to correct for wavefront errors on a timescale faster than which the atmosphere (causing the wavefront errors) changes.

Those skilled in the art will recognize other uses for the high speed readouts representing wavefront errors that are provided by the present invention.

The present invention enables rapid determination of wavefront errors using a holographic optical element (HOE), a position readout detector and a readout device. The HOE includes a hologram of a particular wavefront recorded with a plurality of reference waves, each reference wave defining a particular aberration coefficient. The position readout detector includes a plurality of position sensing devices each sensing in the input wavefront the occurrence and magnitude of any of the particular aberrations as defined by the plurality of reference waves recorded to the holographic optical element with the particular wavefront. The readout device provides a readout value of each position sensing device upon application of the input wavefront to the holograph optical element. When an input wavefront is input to the HOE, the readout value of each position sensing device represents the presence and magnitude in the input wavefront of any of the particular aberrations defined by the plurality of reference.

Only an exemplary embodiment of the present invention is shown and described in the present disclosure. It is to be understood that the present invention is capable of use in various other combinations and environments and is capable of changes or modifications within the scope of the inventive concept as expressed herein.

What is claimed is:

1. An apparatus for reading out wavefront errors of an input wavefront comprising:
   holographic optical element receiving the input wavefront and providing first optical output that is focused at a first focal point corresponding to a first component of the input wavefront and providing a second optical output that is focused at a second focal point corresponding to a second component of the input wavefront different from the first component, where the first focal point is different from the second focal point; and
   a position readout detector receiving the optical outputs of the holographic optical element at the first and second focal points on the position readout detector and providing a readout representing a measurement of the presence and magnitude of each of the first and second components in the input wavefront.

2. The apparatus according to claim 1, wherein the position readout detector is a position sensing device configured to received the optical outputs of the holographic optical element, the positioning sensing device includes a pair of output contacts, the pair of output contacts providing a current inversely related to a degree of lateral displacement of a respective component of the input wavefront that corresponds to each of the first and second components.

3. The apparatus according to claim 2, wherein the positioning sensing device comprises a reversed biased, lateral effects photoconductive junction with a wide collection area and an anode layer, the output contacts of the pair of output contacts are positioned at opposing ends of the anode layer which is doped to behave as a resistive element to photogenerated carriers, created by the input wavefront, moving towards the respective output contacts.

4. The apparatus according to claim 3, further comprising:
   an analog computational device provided corresponding to the position sensing device, the analog computation device connected to each output contact of the pair of output contacts of the positioning sensing device and performing a combinatorial math function of $(A-B)/(A+B)$ to provide a voltage value, where A and B are voltages corresponding to respective output contacts of the pair of output contacts of the positioning sensing device.

5. The apparatus according to claim 4, wherein the analog computational device comprises a plurality of analog operational amplifiers.

6. An apparatus for rapidly reading out wavefront errors of an input wavefront comprising:
   a holographic optical element configured to receive the input wavefront and including a hologram of a particular wavefront recorded with a plurality of reference waves, each reference wave defining a particular aberration coefficient;
   a position readout detector including a plurality of position sensing devices configured to received an optical output of the holographic optical element, each position sensing device providing a readout representing the presence and magnitude in the input wavefront of any of the particular aberration coefficients defined by the plurality of reference waves recorded to the holographic optical element; and a computational device receiving the readout of the position readout detector and a performing a computation to provide a value corresponding to said any of the particular aberration coefficients.

7. The apparatus according to claim 6, wherein each positioning sensing device is connected to ground via a bias voltage and includes a pair of output contacts, the pair of output contacts providing a current inversely related to a degree of lateral displacement of a respective component of the input wavefront that corresponds to one of the particular aberrations coefficients defined by the plurality of reference waves.

8. The apparatus according to claim 7, wherein said each positioning sensing device comprises a reversed biased, lateral effects photoconductive junction with a wide collection area and an anode layer, the output contacts of the pair of output contacts are positioned at opposing ends of the anode layer which is doped to behave as a resistive element to photo-generated carriers, created by the input wavefront, moving towards the respective output contacts.

9. The apparatus according to claim 8, wherein said computational device comprises a plurality of analog computational devices provided corresponding to each position sensing device, each analog computation device connected to each output contact of the pair of output contacts of a corresponding positioning sensing device and performing a combinatorial math function of $(A-B)/(A+B)$ to provide a single voltage value, where A and B are voltages corresponding to respective output contacts of the pair of output contacts of the corresponding positioning sensing device.

10. The apparatus according to claim 9, wherein said each analog computational device comprises a series of analog operational amplifiers.

11. An apparatus for reading out wavefront errors of an input wavefront comprising:
a holographic device formed by having a hologram that has a plurality of components, each component representing a different coefficient of the input wavefront, each coefficient focusing to a different focal point when receiving the input wavefront and providing an output corresponding to that particular coefficient of the input wavefront;
a position readout detector having a plurality of sensing areas, each sensing area located at a location corresponding to a different coefficient, and receiving the components to provide a readout representing the presence and magnitude of the particular coefficient in the input wavefront; and
a computational device receiving the readout of the position readout detector and a performing a computation to provide a value corresponding to the particular coefficient.

12. The apparatus according to claim 11, wherein the position readout detector is a position sensing device configured to received the output of the holographic device receiving the input wavefront, the positioning sensing device includes a pair of output contacts providing a current inversely related to a degree of lateral displacement of a respective component of the input wavefront that corresponds to the particular coefficient.

13. The apparatus according to claim 12, wherein the positioning sensing device comprises a reversed biased, lateral effects photoconductive junction with a wide collection area and an anode layer, the output contacts of the pair of output contacts are positioned at opposing ends of the anode layer which is doped to behave as a resistive element to photo-generated carriers, created by the input wavefront, moving towards the respective output contacts.

14. The apparatus according to claim 13, further comprising:
an analog computational device provided corresponding to the position sensing device, the analog computation device connected to each output contact of the pair of output contacts of the positioning sensing device and performing a combinatorial math function of $(A-B)/(A+B)$ to provide a voltage value, where A and B are voltages corresponding to respective output contacts of the pair of output contacts of the positioning sensing device.

15. The apparatus according to claim 14, wherein the analog computational device comprises a series of analog operational amplifiers.

16. The apparatus according to claim 1, wherein the first component of the input wavefront is a first aberration of the input wavefront and the second component of the input wavefront is a second aberration of the input wavefront.

17. The apparatus according to claim 11, wherein the plurality of components are a plurality of different aberrations of the input wavefront.

18. An apparatus for reading out wavefront errors in an input wavefront comprising:
a holographic optical element outputting plural focal spots, each representing one of plural components of the input wavefront, and
a position readout detector having a position sensing device associated with each of said plural focal spots produced by said holographic optical element; each position sensing device being an analog sensor such that the magnitude of each component is sensed by an associated position sensing device.

19. The apparatus according to claim 18, wherein each component is an orthogonal component.

20. The apparatus according to claim 19, wherein the focal spot of each orthogonal component shifting along a path in relation to intensity of that orthogonal component.

21. The apparatus according to claim 18, wherein the position sensing device is a buried channel provided in a substrate, the focal spot causing said buried channel to connect to said substrate forming a resistance related to focal spot position.

22. The apparatus according to claim 18, wherein holographic optical element includes a hologram of a particular wavefront recorded with a plurality of reference waves defining a plurality of coefficients of a Zernike polynomial.

23. The apparatus according to claim 18, wherein the plural focal points represents a presence and a magnitude of a particular aberration of plural aberrations in the input wavefront.

24. The apparatus according to claim 18, wherein
the position sensing device having a first-type substrate and a second-type substrate, and
a first output contact and a second output contact are positioned on a surface of the second-type substrate so that the first output contact and the second output contact provide currents that are inversely related to a distance from a point of an impinging photon on the surface of the second-type substrate.

25. The apparatus according to claim 24, wherein the positioning sensing device comprises a reversed biased, lateral effects photoconductive junction with a wide collection area and an anode layer, the output contacts of the pair of output contacts are positioned at opposing ends of the anode layer which is doped to behave as a resistive element to photo-generated carriers, created by the input wavefront, moving towards the respective output contacts.

26. The apparatus according to claim 24, further comprising:

an analog computation device connected to each output contact of the first output contact and the second output contact of the positioning sensing device and performing a combinatorial math function of (A−B)/(A+B) to provide a voltage value, where A and B are voltages corresponding to respective output contacts of the first output contact and the second output contact of the positioning sensing device.

27. The apparatus according to claim 19, wherein each orthogonal component is a coefficient of an equation describing the wavefront.

28. The apparatus according to claim 27, wherein the equation is a Zernike polynomial.

* * * * *

UNITED STATES PATENT AND TRADEMARK OFFICE
CERTIFICATE OF CORRECTION

| | | |
|---|---|---|
| PATENT NO. | : 7,645,972 B2 | Page 1 of 1 |
| APPLICATION NO. | : 11/637787 | |
| DATED | : January 12, 2010 | |
| INVENTOR(S) | : Stevens et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 20 days.

Signed and Sealed this

Twenty-eighth Day of December, 2010

David J. Kappos
*Director of the United States Patent and Trademark Office*